US011249250B2

(12) United States Patent
Jasion et al.

(10) Patent No.: US 11,249,250 B2
(45) Date of Patent: Feb. 15, 2022

(54) HOLLOW CORE OPTICAL FIBRE

(71) Applicant: University of Southampton, Southampton (GB)

(72) Inventors: Gregory Teofil Jasion, Southampton Hampsihire (GB); Francesco Poletti, Southampton Hampshire (GB)

(73) Assignee: University of Southampton, Southampton (GB)

( * ) Notice: Subject to any disclaimer, the term of this patent is extended or adjusted under 35 U.S.C. 154(b) by 0 days.

(21) Appl. No.: 17/266,685

(22) PCT Filed: Jul. 31, 2019

(86) PCT No.: PCT/GB2019/052145
§ 371 (c)(1),
(2) Date: Feb. 8, 2021

(87) PCT Pub. No.: WO2020/030888
PCT Pub. Date: Feb. 13, 2020

(65) Prior Publication Data
US 2021/0311250 A1    Oct. 7, 2021

(30) Foreign Application Priority Data
Aug. 8, 2018   (GB) ................................ 1812909

(51) Int. Cl.
*G02B 6/02*   (2006.01)
*G02B 6/024*   (2006.01)
(Continued)

(52) U.S. Cl.
CPC ........ *G02B 6/032* (2013.01); *C03B 37/02781* (2013.01); *G02B 6/02328* (2013.01); *C03B 2203/16* (2013.01)

(58) Field of Classification Search
CPC ............ G02B 6/02328; G02B 6/02357; G02B 6/024; G02B 6/032
See application file for complete search history.

(56) References Cited

U.S. PATENT DOCUMENTS

2017/0160467 A1   6/2017  Poletti et al.
2019/0212148 A1*  7/2019  Sanders ............... G01C 19/727
(Continued)

FOREIGN PATENT DOCUMENTS

| EP | 3 249 432 A1 | 11/2017 | |
| EP | 3766842 A1 * | 1/2021 | ......... C03B 37/0124 |
| WO | 2015/185761 | 12/2015 | |

OTHER PUBLICATIONS

Habib, Selim, et al., "Single-mode, low loss hollow-core anti-resonant fiber designs", Optics Express, 3824, vol. 27, No. 4 (Year: 2019).*

(Continued)

*Primary Examiner* — Eric Wong
(74) *Attorney, Agent, or Firm* — Renner, Otto, Boiselle & Sklar, LLP

(57) ABSTRACT

A hollow core optical fibre comprises a tubular jacket; a cladding comprising a plurality of primary capillaries spaced apart from one another in a ring and each bonded to an inner surface of the jacket at a peripheral location around the circumference of the jacket; and a hollow core formed by a central void within the ring of primary capillaries; wherein the cladding further comprises, within each primary capillary, two secondary capillaries and no more, the two secondary capillaries spaced apart from one another and each bonded to an inner surface of the primary capillary at an azimuthal location around the circumference of the primary capillary which is displaced from the peripheral location of the primary capillary.

19 Claims, 7 Drawing Sheets

(51) Int. Cl.
  *G02B 6/032* (2006.01)
  *C03B 37/027* (2006.01)

(56) References Cited

U.S. PATENT DOCUMENTS

2019/0377131 A1* 12/2019 Russell ............... C03B 37/0122
2020/0156987 A1*  5/2020 Wheeler ............ G02B 6/02357
2020/0278491 A1*  9/2020 Poletti ................ G02B 6/02328

OTHER PUBLICATIONS

International Search Report and Written Opinion for corresponding International Patent Application No. PCT/GB2019/052145, dated Sep. 8, 2019.
UK Search Report, issued in Application No. GB1812909.8, dated Feb. 1, 2019.
Francesco Poletti, "Nested antlresonant nodeless hollow core fiber," Opt. Express 22, 23807-23828 (2014), p. 23807, XP055221870.
MD. Selim Habib, Ole Bang, and Morten Bache, "Low-loss hollow-core silica fibers with adjacent nested anti-resonant tubes," Opt. Express 23 (2015), p. 17394, XP055402307.
A.F. Kosolapov et al., "Hollow-core revolver fibre with a double-capillary reflective cladding," in Quantum Electronics 46 (2016), pp. 267-270, XP055502520.
Anton N. Kolyadin, Alexey F. Kosolapov, Andrey D. Pryamikov, Alexander S. Biriukov, Victor G. Plotnichenko, and Evgeny M. Dianov, "Light transmission in negative curvature hollow core fiber in extremely high material loss region," Opt. Express 21, 9514-9519 (2013).
W. Belardi and J.C. Knight, "Negative curvature fibers with reduced leakage loss," in Optical Fiber Communication Conference, OSA Technical Digest (online) (Optical Society of America, 2014), paper Th2A.45, pp. 1-3, XP032633307.
W. Belardi et al., "Hollow antiresonant fibres with low bending loss," Optics Express, Apr. 18, 2014, pp. 10091-10096, vol. 22, Issue 8.
W. Belardi et al., "Hollow antiresonant fibres with reduced attenuation," Optics Letters, Apr. 1, 2014, pp. 1853-1856, vol. 39, Issue 7.

* cited by examiner

HOLLOW CORE OPTICAL FIBRE

This application is a national phase of International Application No. PCT/GB2019/052145, filed on Jul. 31, 2019, which claims priority to GB Application No. 1812909.8, filed on Aug. 8, 2018, all of which are herby incorporated by reference.

BACKGROUND OF THE INVENTION

The present invention relates to hollow core optical fibres.

Classes of optical fibre include hollow core fibres, in which light is guided along a longitudinal hollow void forming the fibre's core by an optical guidance mechanism enabled by the presence of a structured arrangement of longitudinal cladding capillaries surrounding the void. Various configurations for the cladding capillaries are known, producing different guidance mechanisms. An example is hollow core photonic bandgap fibre (HCPBF, alternatively hollow core photonic crystal fibres, HCPCF), in which the cladding comprises a regular closely packed array of many small glass capillaries from which a central group is excluded to define a substantially circular hollow core. The periodicity of the cladding capillary structure provides a periodically structured refractive index and hence a photonic bandgap effect that confines a propagating optical wave within the core.

In contrast to the microstructured array of cladding capillaries in HCPBF, a second type of hollow core fibre is the antiresonant hollow core fibre, ARF. Fibres of this type have a simpler cladding geometry, comprising a lesser quantity of larger glass capillaries or tubes arranged in a ring around a central core void. The structure lacks any high degree of periodicity so that no photonic bandgap exists, and instead, antiresonance is provided for propagating wavelengths which are not resonant with a wall thickness of the cladding capillaries, in other words, for wavelengths in an antiresonance window which is defined by the cladding capillary wall thickness. The antiresonance acts to inhibit coupling between air-guided optical modes supported by the core and any optical modes which the cladding may support, so that light is confined to the core and can propagate at low loss by an antiresonant optical guidance effect.

Modifications and variations to the basic ring of ARF cladding capillaries have been proposed with the aim of enhancing fibre performance. Many applications known for conventional solid core optical fibres have been demonstrated with hollow core fibres, including telecommunications, optical power delivery and optical sensing. For telecommunications uses in particular, low optical loss (being the fraction of propagating light lost per unit length of propagation, typically per kilometre) is critical, and loss levels achieved thus far with hollow core fibres are not yet fully competitive with the performance available from solid core fibres.

Accordingly, designs of hollow core optical fibre offering improved low optical loss are of interest.

SUMMARY OF THE INVENTION

Aspects and embodiments are set out in the appended claims.

According to a first aspect of certain embodiments described herein, there is provided a hollow core optical fibre comprising: a tubular jacket; a cladding comprising a plurality of primary capillaries spaced apart from one another in a ring and each bonded to an inner surface of the jacket at a peripheral location around the circumference of the jacket; and a hollow core formed by a central void within the ring of primary capillaries; wherein the cladding further comprises, within each primary capillary, two secondary capillaries and no more, the two secondary capillaries spaced apart from one another and each bonded to an inner surface of the primary capillary at an azimuthal location around the circumference of the primary capillary which is displaced from the peripheral location of the primary capillary.

According to a second aspect of certain embodiments described herein, there is provided a preform or a cane for making a hollow core optical fibre which is configured to be drawn into a hollow core optical fibre according to the first aspect.

According to a third aspect of certain embodiments described herein, there is provided a preform or a cane for making a hollow core optical fibre, and comprising: an outer tube for forming a jacket; a plurality of primary tubes for forming primary capillaries to define a cladding of the fibre, the primary tubes spaced apart from one another in a ring around a central void to form a hollow core, each primary tube arranged against an inner surface of the outer tube at a peripheral location around the circumference of the outer tube; and within each primary tube, two secondary tubes and no more, the secondary tubes spaced apart from one another and each arranged against an inner surface of the primary tube at an azimuthal location around the circumference of the primary tube which is displaced from the peripheral location of the primary tube.

These and further aspects of certain embodiments are set out in the appended independent and dependent claims. It will be appreciated that features of the dependent claims may be combined with each other and features of the independent claims in combinations other than those explicitly set out in the claims. Furthermore, the approach described herein is not restricted to specific embodiments such as set out below, but includes and contemplates any appropriate combinations of features presented herein. For example, optical fibres may be provided in accordance with approaches described herein which includes any one or more of the various features described below as appropriate.

BRIEF DESCRIPTION OF THE DRAWINGS

For a better understanding of the invention and to show how the same may be carried into effect reference is now made by way of example to the accompanying drawings in which.

DETAILED DESCRIPTION

Figure 1:
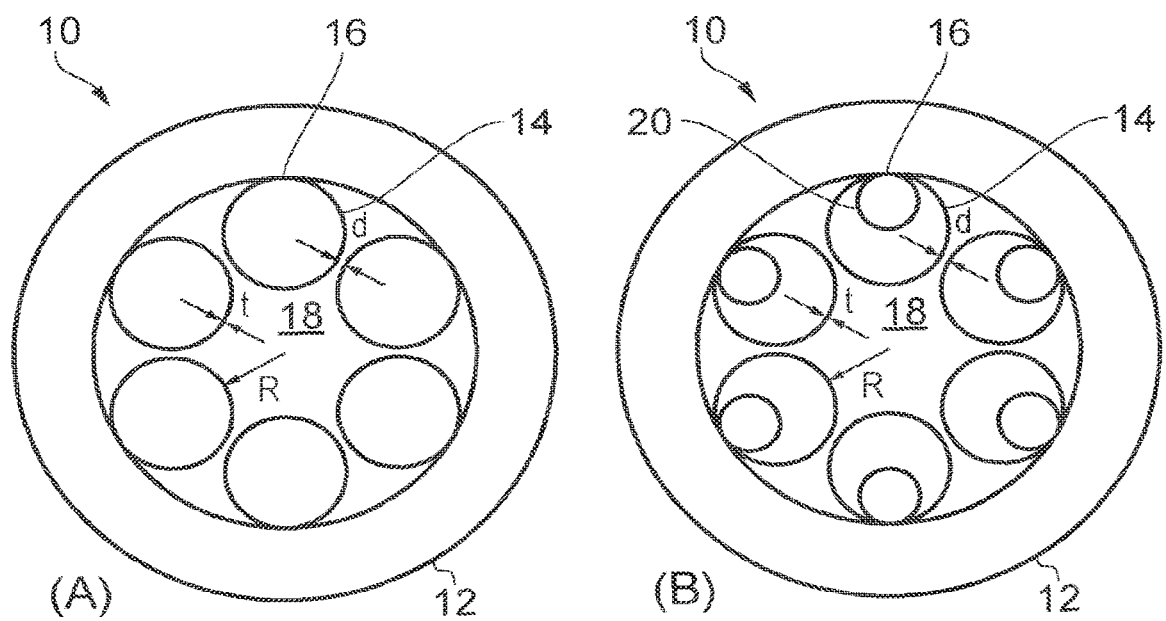
FIGS. 1(A) and 1(B) show schematic transverse cross-sectional views of antiresonant hollow core fibres, including cladding features from two known fibre designs.

Aspects and features of certain examples and embodiments are discussed/described herein. Some aspects and features of certain examples and embodiments may be implemented conventionally and these are not discussed/described in detail in the interests of brevity. It will thus be appreciated that aspects and features of optical fibres discussed herein which are not described in detail may be implemented in accordance with any conventional techniques for implementing such aspects and features.

The type of hollow core optical fibre that can be described as antiresonant hollow core fibre (ARF) at its simplest comprises a tubular outer jacket, and number of cladding capillaries arranged in a ring inside the jacket, and secured or bonded to the inner surface of the jacket. A central void within the ring of capillaries forms a hollow core along which one or more optical modes can be guided by an antiresonant waveguiding effect.

FIG. 1(A) shows a transverse cross-sectional view of a first previously-proposed antiresonant hollow core fibre. The view shows a full transverse cross section through a fibre with a circular cross-section. The fibre 10 has an outer tubular jacket 12. A plurality of tubular or hollow cladding capillaries or cells 14, in this example six capillaries of the same cross-sectional size and shape, are arranged inside the jacket 12 in a ring, so that the longitudinal axes of each cladding capillary 14 and of the jacket 12 are substantially parallel. The cladding capillaries define elongate holes, lumen or cavities which run continuously along the length of the optical fibre. The number of capillaries allows this structure to be labelled as a 6 cell ARF. The cladding capillaries or tubes 14 are each in contact with (bonded to) the inner surface of the jacket 12 at a location 16, such that the cladding capillaries 14 are evenly spaced around the inner circumference of the jacket 12, and are also spaced apart from each other (there is no contact between neighbouring capillaries). The cladding structure is limited to these cladding capillaries only [1]. In some designs of ARF, the cladding tubes 14 may be positioned around the ring so that adjacent tubes are in contact with each other (in other words, not spaced apart as in FIG. 1(A)), but spacing to eliminate this contact can improve the fibre's optical performance. The spacing removes optical nodes that arise at contact points between touching adjacent tubes and which tend to cause undesirable resonances that result in high losses. Accordingly, fibres with spaced-apart cladding capillaries as in FIG. 1(A) may be referred to as "nodeless" antiresonant hollow core fibres.

The arrangement of the cladding capillaries 14 in a ring around the inside of the jacket 12 creates a central space, cavity or void within the fibre 10, also with its longitudinal axis parallel to those of the jacket 12 and capillaries 14, which is the fibre's hollow core 18, also extending continuously along the fibre's length. The core 18 is bounded by the inwardly facing parts of the outer surfaces of the cladding capillaries 14. This is the core boundary, and the material (glass or polymer, for example) of the capillary walls that make up this boundary provides the required antiresonance optical guidance effect or mechanism. The core boundary has a shape comprising a series of adjacent inwardly curving surfaces (that is, convex from the point of view of the core). This contrasts with the usual outward curvature of the core-cladding interface in a solid-core fibre, and the substantially circular core boundary of a hollow core photonic bandgap optical fibre. Accordingly, antiresonant hollow core fibres can be described as negative curvature fibres. Mathematically, this can be defined as the surface normal vector of the core boundary being oppositely directed to a radial unit vector (vector along a radius of the transverse cross-section of the fibre). The negative curvature (convex shape) of the core boundary also inhibits coupling between the fundamental core mode and any cladding modes. A negative curvature antiresonant hollow core fibre has a core boundary formed by a convex membrane or wall (typically of glass) which a thickness which is matched to be in antiresonance with the guided optical wavelength.

Some geometrical or dimensional parameters of interest are indicated in FIG. 1(A). The capillaries 14 have a wall thickness t. Each capillary 14 is spaced apart from its neighbour by a gap or separation d, which is the smallest distance between the outer surfaces of two adjacent capillaries. Typically, the capillaries 14 are evenly spaced around the inner surface of the jacket 12, so each gap has the same value of d. The central core 18 has a radius R, which is the smallest distance from the centre of the fibre 10 (location of the fibre's longitudinal axis, which is orthogonal to the plane of the page showing FIG. 1) to the outer surface of each cladding capillary 14. In this example, the capillaries are all the same size, so this distance is the same for each capillary 14 and is the radius of the largest circle which can be fitted into the cross-section of the core 18.

FIG. 1(B) shows a transverse cross-sectional view of a second previously-proposed antiresonant hollow core fibre [2, 3]. The fibre includes all the features of the FIG. 1(A) example, but the cladding has a more complex structure Each cladding capillary 14 is a primary capillary, still spaced from its neighbour by a gap d, and has a secondary, smaller capillary 20 nested inside it, bonded to the inner surface of the cladding capillary 14 at the same azimuthal position around the jacket 12 as the point of bonding 16 between the primary capillary 14 and the jacket 12. These additional smaller capillaries 20 are included with the aim of reducing the optical loss in the fibre. Additional still smaller tertiary capillaries may be nested inside the secondary capillaries, again bonded in line with the azimuthal contact locations 16. ARF designs of this type, with secondary and optionally further smaller capillaries, may be referred to as "nested antiresonant nodeless fibres", or NANFs. The six primary capillaries of this example allow this structure to be labelled as a 6 cell NAN F.

The example cladding structures shown in FIGS. 1(A) and 1(B) comprise six primary cladding capillaries arranged in a ring around the core. ARFs are not so limited however, and may instead comprises five or fewer or seven or more capillaries forming the boundary around the hollow core. This is true of these previously-proposed examples, and of ARFs according to the present disclosure which are described below.

Figure 2:
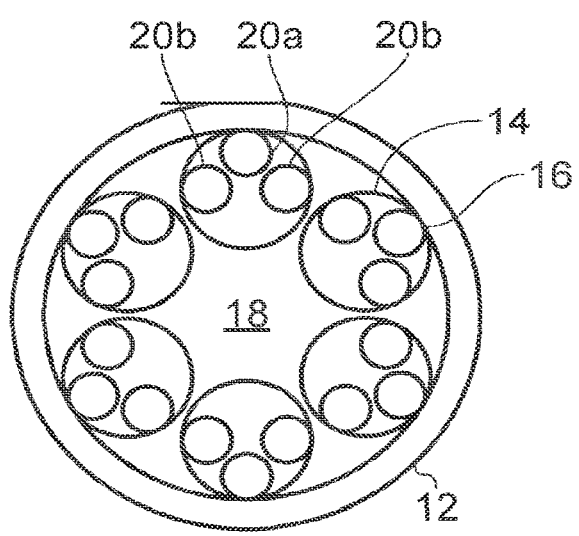
FIG. 2 shows a schematic transverse cross-sectional view of an antiresonant hollow core fibre of a known design.

FIG. 2 shows a transverse cross-sectional view of another previously proposed antiresonant hollow core fibre structure [4]. In common with the FIG. 1 example, the fibre comprises six primary capillaries 14 bonded at positions 16 at regular intervals around the inner surface of an outer tubular jacket 12, and spaced apart from one another. Inside each primary capillary there are three secondary capillaries 20, each bonded to the inner surface of the respective primary capillary 14. In each primary capillary, a first secondary capillary 20a is bonded in line with the contact point 16 between the jacket 12 and the primary capillary 14. The other two secondary capillaries 20b are arranged one on each side of the first secondary capillary 20a and spaced apart from the first secondary capillary 20a by an angle of 90°, measured as an azimuthal position around the circumference of the primary capillary 14.

It is commonly accepted in the technical field of hollow core optical fibres that the inclusion of a secondary capillary nested inside a primary capillary so that both capillaries are bonded at the same azimuthal position on the circumference of the outer jacket (as in the lower half of FIG. 1 and FIG. 2) provides a second reflective element, in addition to that provided by the primary capillary, which acts to reduce optical loss. Furthermore it is also commonly assumed that the gap or spacing between the adjacent primary capillaries, while improving performance by removing unwanted resonances at contact between adjacent capillaries, also contributes to the leakage of optical power. Therefore, the gap is generally made small to reduce leakage and hence loss, while being maintained above a zero spacing so as to avoid resonances.

However, the inventors have found that this theory of optical loss is not correct, and based on an improved understanding of the loss mechanism in ARFs, propose an alternative configuration for the cladding capillaries.

Figure 3:
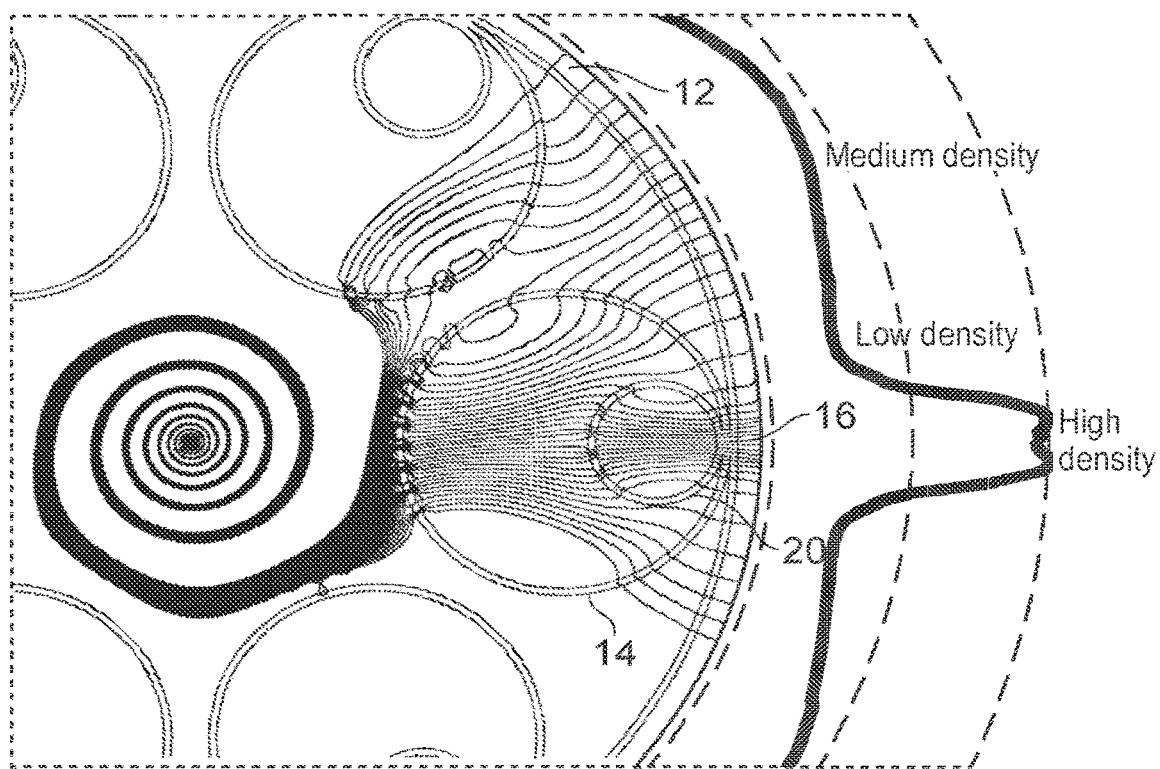
FIG. 3 shows a schematic transverse cross-sectional view of an antiresonant hollow core fibre of a known design with superimposed lines to indicate transverse optical power flow derived from modelling.

FIG. 3 shows a transverse cross-sectional view of part of an ARF with a previously-proposed 6-cell NANF cladding structure (as described above with reference to FIG. 1(B)). Superimposed on it are black lines obtained from modelling the flow of optical power in the transverse plane, by tracing flow lines of the transverse Poynting vector. Optical power flowing radially outwards from the core to the outer surface of the cladding is power which is lost from the desired forward direction of propagation of power along the length of the fibre's core, and hence contributes to the level of optical loss in the fibre. In FIG. 3, the black lines are streamlines that follow the transverse power flow vector fields, which are seeded in the centre of the core and spiral outwards towards the cladding tubes. The curve shown to the right of the fibre plots the total transversely leaked optical power, for each position around the circumference of the fibre (fibre boundary). The height of the curve measured from the depicted outer surface of the fibre corresponds to the density of the power flow lines at the fibre-air boundary.

From this model, it is clear that the largest regions of power loss are at the locations of the nested cells. The radial region aligned with the bonding point 16 of the nested capillaries 14, 20 to the inside surface of the jacket 12 has the highest density of streamlines, and the curve of transverse power leakage has significant peaks at these locations (labelled "high density"). The adjacent regions on either side of each bonding point 16, aligned with the roughly crescent-shaped regions between the outer surface of a primary capillary 14 and the inner surface of the jacket 12 have a much lower transverse power leakage (labelled "low density"). The regions in the centre of each crescent region which are radially aligned with the gaps between the spaced-apart primary capillaries 14 have a slightly higher transverse power leakage (labelled "medium density") which nevertheless is substantially less than the peak power loss through the nested capillary structure.

Therefore, the inventors have identified that the main source of radial light leakage, which tends to be the dominant optical loss mechanism in ARFs, is not the gaps between the spaced-apart primary capillaries. This is contrary to the general understanding of these fibres, in which the gaps are typically minimised to reduce loss. Rather, these parts of the cladding structure contribute only a small part in the overall loss, and instead the principal loss of power arises at the regions in line with the nested capillaries, at the azimuthal positions around the jacket where the secondary capillaries are bonded inside the primary capillaries which are bonded inside the jacket. The transverse power flow lines can be seen to have a complex behaviour, but it can be readily appreciated that the streamlines exhibit their lowest density in each gap between two adjacent primary capillaries 14, indicating low transverse power flow in these regions. As can be observed from FIG. 3, these features are the most effective parts of the cladding structure at light confinement.

Accordingly, the present disclosure proposes a new geometry or design of nested cladding capillaries for ARFs which introduces more of the newly-identified leakage-reducing low loss features, while removing the high leakage features, namely the radial alignment of the nested capillaries. At the same time, the simplicity of known ARF designs is preserved, together with the associated relative ease of fabrication. Structures in accordance with the disclosure show vastly superior performance in terms of reduced optical power loss.

Figure 4:
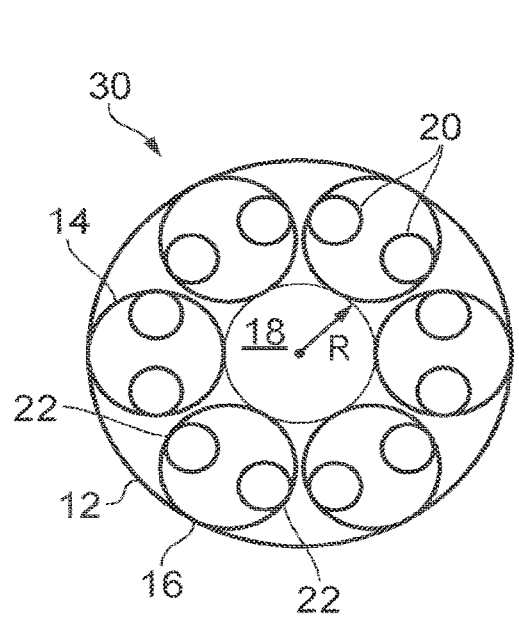
FIG. 4 shows a schematic transverse cross-sectional view of a first example of an antiresonant hollow core fibre according to the present disclosure.

FIG. 4 shows a transverse cross-sectional view of a first example hollow core fibre according to the present disclosure. The fibre 30 comprises an hollow tubular outer jacket 12. A series of six primary capillaries 14 are arranged in a ring around the inner surface of the jacket 12. The primary capillaries 14 in this example each have the same size and circular shape, and are each bonded, secured or fixed to the inner surface of the jacket 12 at a different azimuthal position 16 around the circumference of the jacket 12 so that the primary capillaries 14 are evenly spaced around the ring. Also, the primary capillaries 14 are each spaced apart from the two adjacent capillaries, so that there are gaps between adjacent capillaries, each gap being substantially the same width since the primary capillaries 14 have the same size and shape. The central space or void defined by the surrounding ring of primary capillaries 14 is the fibre's hollow core 18. The capillaries (also tubes, cells or lumens) form the structured cladding of the fibre 30 for waveguiding along the core 18. The core 18 has a radius R, being the radius of the largest circle that can be circumscribed around the core 18 within the ring of primary capillaries 14, and hence also the distance from the centre of the fibre's transverse structure to the closest point on the outer surface of the primary capillaries 14.

Additionally, each primary capillary has two separate secondary capillaries 20 nested within it. By the term "nested" is meant that a secondary capillary is inside a primary capillary, with the longitudinal dimensions or axes of the two capillaries being substantially parallel, and also parallel to the longitudinal axes of the jacket and of the fibre overall. Also, each secondary capillary 20 is in contact with, and bonded, fixed or secured to, the inner surface of its associated primary capillary 14 at a contact point or location 22, being an azimuthal position around the circumference of the primary capillary. Within each primary capillary 14, the two secondary capillaries are sized and positioned so that they are not in contact with one another. There is a gap or space between the two secondary capillaries 20 which are inside each primary capillary 14. This gap is the smallest separation between the outer surfaces of the two secondary capillaries 20, in other words the distance between the point on each outer surface which is closest to the other outer surface. The secondary capillaries all have the same size and circular shape. Significantly, neither secondary capillary 20 is radially aligned within its primary capillary 14. The contact point 22 at which each secondary capillary 20 is bonded to the primary capillary 14 does not lie along a radius of the fibre 30 from the centre of the core 18 to the contact point 16 at which the primary capillary 14 is bonded to the jacket 12. The contact point 22 at which each secondary capillary 20 is bonded to the primary capillary 14 has an azimuthal or angular spacing, separation or displacement from the contact point 16 at which the primary capillary 14 is bonded to the jacket 12, around the circumference (perimeter, periphery) of the primary capillary 14. In this particular example, the two secondary capillaries 20 in each primary capillary 14 have an equal and opposite azimuthal displacement from the contact point 16 of the primary capillary; they are symmetrically positioned on either side of the radius from the core centre (also the fibre centre) to the contact point 16 of the primary capillary 14. Hence, a line joining the two contact points 22 of the secondary capillaries 20 to the primary capillary 14 is orthogonal to the radius from the core centre to the contact point 16 of the primary capillary 14 to the jacket 12. The displacement in this example is 90°. Hence, the line joining the two contact points 22 lies along a diameter of the primary capillary 14 which is orthogonal to the radius from the core centre to the contact point 16. Also, the radii of the primary capillary which join the primary capillary centre to each of the contact points 22 lie along this same diameter.

Figure 5:
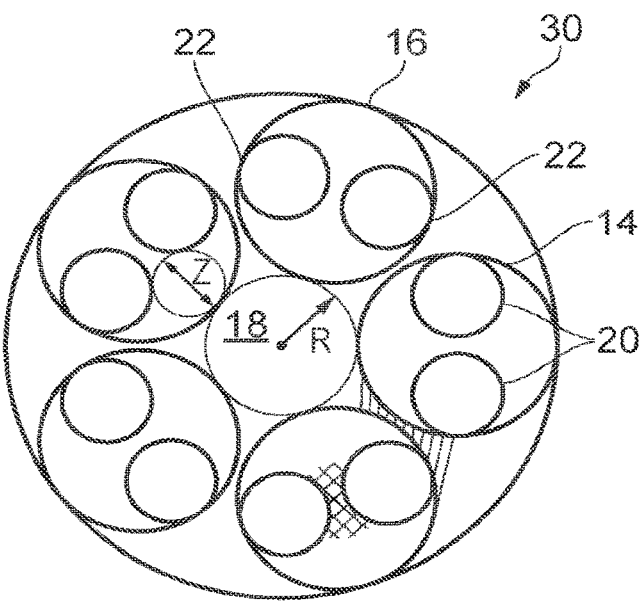
FIG. 5 shows a schematic transverse cross-sectional view of a second example of an antiresonant hollow core fibre according to the present disclosure.

FIG. 5 shows a transverse cross-sectional view of a second example hollow core fibre according to the present disclosure. Whereas the example of FIG. 4 has six evenly spaced primary capillaries, each containing two secondary capillaries, the FIG. 5 fibre 30 has five primary capillaries 14, again evenly spaced around the inner surface of the jacket, and of the same size and circular shape, and as before, each containing two spaced apart secondary capillaries 20, each of the same size and circular shape. Apart from this difference in the number of primary capillaries, the structure of the fibre 30 is the same as that of the FIG. 4 example.

This arrangement of secondary capillaries within the primary capillaries, away from the positions at which the primary capillaries are bonded inside the jacket, introduces into the cladding additional shaped features which have been determined from the modelling shown in FIG. 3 to reduce radial leakage of optical power. As described above, the gaps between the outer surfaces of the adjacent primary capillaries show the lowest radial power leakage. In FIG. 5, one of these areas is hatched for illustrative purposes. Placement of two separate secondary capillaries inside a primary capillary so that they are spaced apart on either side of the azimuthal position of the primary capillary inside the jacket creates an additional similarly shaped region or gap inside each primary capillary. In FIG. 5, one of these areas is cross-hatched for illustrative purposes. Thus, the low loss features are echoed and duplicated, and high loss features (i.e. the radial alignment of nested capillaries) are removed. This has the overall effect of providing an ARF with superior loss characteristics, as will be described further below.

Note that each primary capillary has two, and only two (that is, not one and not more than two, in other words more than one and fewer than three) secondary capillaries.

Figure 6:
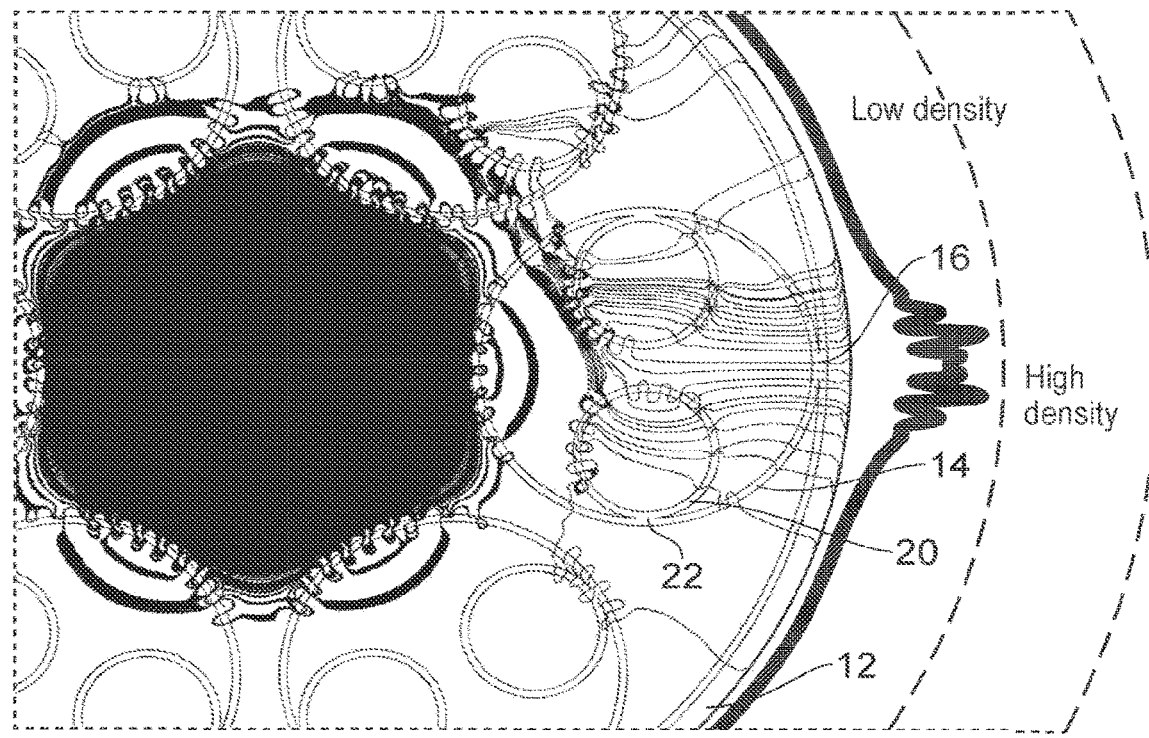
FIG. 6 shows a schematic transverse cross-sectional view of an example antiresonant hollow core fibre according to the present disclosure with superimposed lines to indicate transverse optical power flow derived from modelling.

FIG. 6 shows a transverse cross-sectional view of part of an ARF according to the present disclosure and structured with six primary capillaries as in the FIG. 4 example, with superimposed lines obtained from modelling the flow of optical power in the transverse plane, similar to the modelling results shown in FIG. 3 for the previously-proposed 6-cell NANF cladding structure. The parameters used for the simulation are the same as those used to produce the results shown in FIG. 3, the only difference being the cladding structure with two spaced-apart secondary capillaries 20 inside each primary capillary 14. Again, on the right of the figure is shown a curve representing the amount of transverse power leakage. This curve is plotted on the same scale as the curve in FIG. 3, as indicated by the dashed lines. From this, it can be appreciated that the total power leakage is greatly reduced by the new cladding geometry. Note that while the peaks of power loss are still aligned with the contact points 16 where the primary capillaries 14 are bonded to the jacket 12, the size of the peaks is much smaller than before, with the decreased loss attributable to the gap between the secondary capillaries 20 which lies along the same radial position. The core region appears as solid black in this example; this is because the improved geometry reduces the total power loss away from the core to such an extent that the spiralling streamlines have an extremely tight pitch and overlap one another. Note that, in contrast, the streamlines have a very low density in the gaps between the neighbouring primary capillaries 14 and in the newly added features of the gaps between the neighbouring secondary capillaries 20, indicating that power flow is confined away from these regions.

Although FIGS. 4 and 6 show an example with six primary capillaries or cells and FIG. 5 shows an example with five primary capillaries or cells, the disclosure is not limited in this regard. Fewer than five primary cells may be used, for example four primary cells. More than six primary cells may be used, for example seven, eight, nine or ten primary cells, or more. Greater numbers of primary cells (such as more than six) may be useful in enabling a smaller overall fibre size when designing an ARF for propagating longer wavelengths.

Returning to FIG. 5, a region of width z is indicated, being a space or cavity in which a circle of diameter z is circumscribed inside the primary capillary but outside the secondary capillaries, and opposite to the contact point of the primary capillary with the jacket. The value of z can be tuned for the suppression of higher order optical modes. In order to change the value of z (in other words, to change the diameter of the largest circle which can be circumscribed in the relevant cavity), the secondary capillaries can be varied in size and azimuthal position around the primary capillary, and/or the size of the primary capillary can be varied. The effect of varying these parameters is discussed in more detail below.

In the FIGS. 4 and 5 examples, the gaps between the two secondary capillaries 20 in each primary capillary and the gaps between two adjacent primary capillaries 14 are the same size. For the purpose of modelling the performance of these fibres (described further below), the gaps are selected to have a size of 5T, where T is the thickness of the walls of the primary capillaries and the walls of the secondary capillaries (selected in these examples to be the same). As exemplary dimensions, the core radius R may be 15 µm and the wall thickness t may be 0.55 µm. These dimensions are suitable for a fibre designed for guiding light at a wavelength of substantially 1550 nm, which is a standard or common wavelength used in optical telecommunications applications, owing to its minimal loss in silicon, from which conventional solid core telecommunications optical fibre is made. Accordingly, the core radius is equal to about 10 wavelengths, and the capillary wall thickness is equal to about 0.35 wavelengths. While these values are for example only, the various simulations, models and data discussed below have been obtained for fibres with these dimensions. The results are presented with the geometric or dimensional parameters normalised to wavelength, however, so that they can be scaled for use in the design of fibres for guiding other wavelengths.

Figure 7:
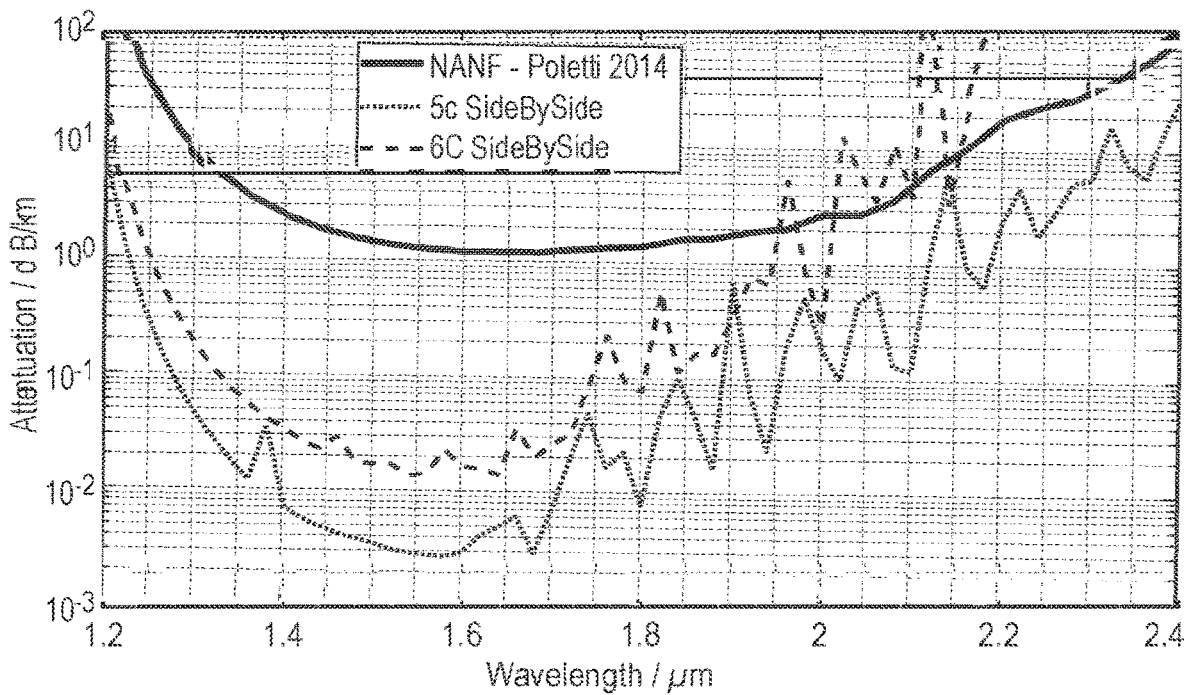
FIG. 7 shows a graph of optical power loss per unit length (attenuation) against wavelength for the known fibre of FIG. 3 and the examples of FIGS. 4 and 5.

FIG. 7 shows a graph of modelled/simulated variation of optical loss (attenuation) with propagating wavelength for the two example fibres of FIGS. 4 and 5, compared to a NANF with six primary capillaries as in FIG. 3 and the same dimensions for wall thickness and core size, propagating wavelength, and primary capillary spacing. The solid line shows loss for the NANF, the dotted line shows loss for the five cell ARF of FIG. 5 and the dashed line shows loss for the six cell ARF of FIG. 4. From this it can be appreciated that the optical performance of the proposed fibre design is excellent, and vastly improved compared to the existing NANF. For the chosen core size, the NANF fibre cannot provide loss performance which is 1 dB/km or less; its loss is greater than this for all wavelengths shown. However, for the newly-proposed five cell fibre structure, the attenuation is significantly less than for the NANF across all wavelengths modelled, from 1.2 µm to 2.4 µm. For the newly-proposed six cell structure, the attenuation is below that of the NANF across the modelled wavelength range of 1.2 µm to about 1.9 µm. For wavelengths between about 1.25 µm and 2 µm, both examples of the new fibre offer attenuation below 1 dB/km, and the attenuation reduces substantially around 1.6 µm. For the six cell fibre, there is an 85 times improvement in optical confinement loss compared to the NANF. The five cell fibre performs even better. The reduced number of primary capillaries allows for more space in the cladding structure (a larger value of the width z can be achieved) which gives greater suppression of higher order optical modes, and superior confinement and reduced impact from resonances. The improvement in optical confinement loss compared to the NANF is close to 450 times. Compared to the six cell fibre, the five cell configuration is also easier to fabricate since it comprises fewer glass elements.

While FIG. 7 shows the loss reduction for the new structure compared with a NANF of the same core size, an alternative approach is to fabricate the new fibres to have a comparable loss to the NANF. This loss level is attainable at a smaller core size in the new fibres than in the NANF, which offers the benefit of low loss compared to a simple ARF design such as FIG. 1(A) combined with a format that facilitates interconnection with conventional standard all-solid silica optical fibres, which have a core size of R 5 µm. This advantage is supplemented by a reduction in bend sensitivity, both macro and micro.

Other loss factors in optical fibres, such as surface scattering, macro-bending and micro-bending, have also been studied for the new design, and have been found to be comparable to the NANF structure as these loss factors are attributable to the core size and shape which can be the same as in the NANF structure.

For fabrication, the new design adds little complexity compared to fabrication of the existing NANF design. Fabrication of hollow core fibres with structured claddings formed from capillaries typically includes pressurisation of the various spaces within the tubes to achieve and maintain the intended cross-sectional structure during drawing of the fibre from a preform or a cane, and the same number of pressurisation regions or zones are needed for the new design as for the NANF. Compared to more complex nested geometries that comprise a smaller, tertiary capillary inside each secondary capillary, but which are comparable to the new design in that two capillaries are nested inside each primary capillary (a secondary and a tertiary instead of newly-proposed two secondaries), fabrication of the new design is considerably simpler since one fewer pressurisation zone is needed. The new design is also compatible with known hollow core fibre drawing techniques, such as approaches using a glass working lathe to fuse the assembly of capillaries. [5]

Figure 8:
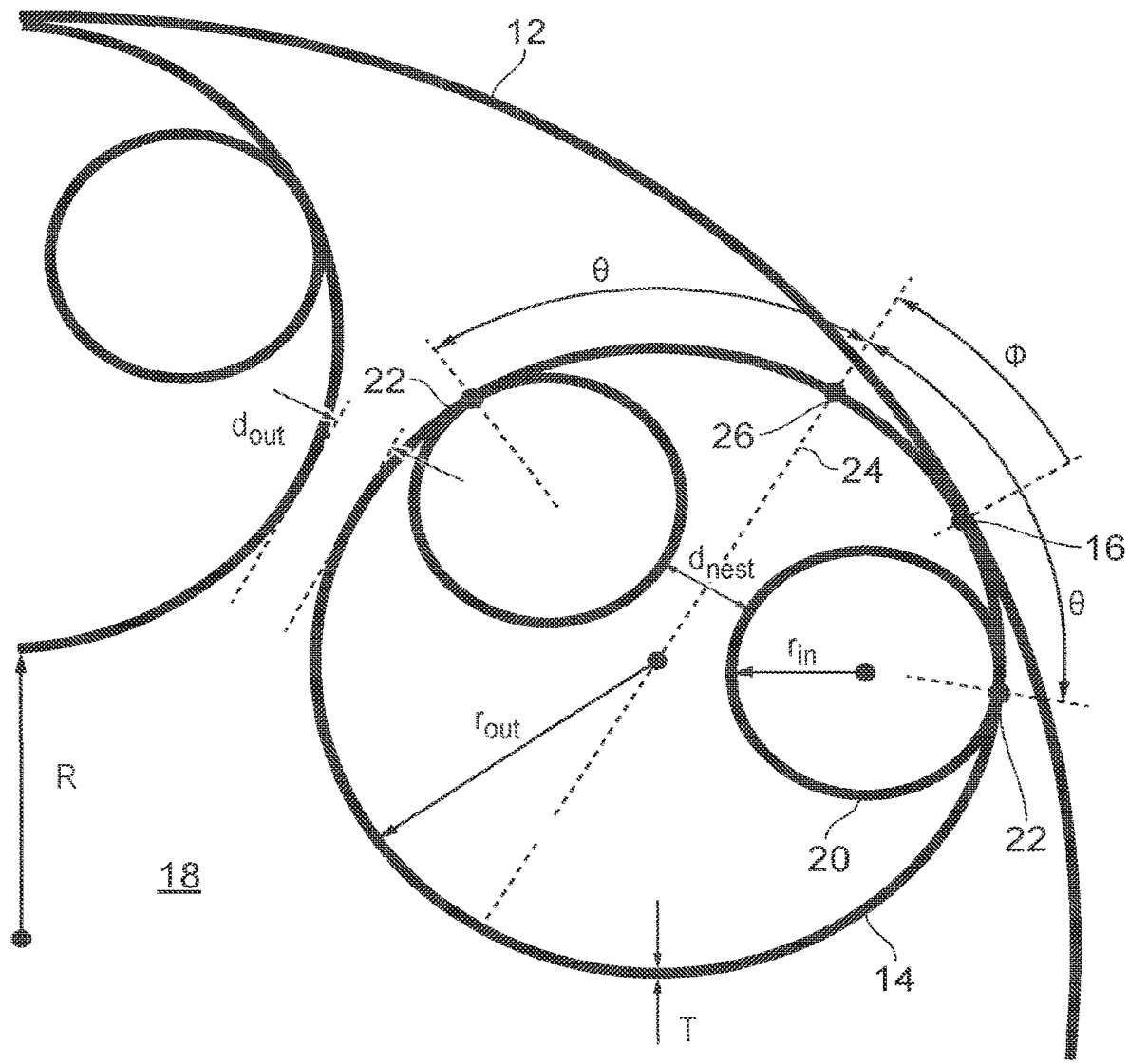
FIG. 8 shows a partial transverse cross-sectional view of an example fibre according to the present disclosure labelled with relevant dimensional and angular parameters.

FIG. 8 shows a transverse cross-sectional view of about one quarter of an ARF configured in accordance with the present disclosure, on which a number of geometric (dimensional and angular) parameters of interest are indicated. The primary capillaries 14 and the secondary capillaries 20 each have a wall thickness T. The central hollow core of the fibre has a diameter R, being the distance from the central longitudinal axis of the fibre/jacket to the outer surface of the primary capillaries. The primary capillaries 14 have an internal radius $r_{out}$, being the distance from the central longitudinal axis of the primary capillary to the inner surface of the primary capillary. The secondary capillaries 20 have an internal radius $r_{in}$, being the distance from the central longitudinal axis of the secondary capillary to the inner surface of the primary capillary. The primary capillaries 14 are substantially evenly positioned around the jacket circumference, with a spacing $d_{out}$ between each adjacent pair of primary capillaries, being the distance between the two closest points of the outer surfaces of the adjacent primary capillaries. Within each primary capillary 14, the two secondary capillaries 20 are spaced apart by a spacing $d_{nest}$, being the distance between the two closest points on the outer surfaces of the secondary capillaries. Each primary capillary 14 is bonded to the jacket 12 at a contact point 16, each contact point 16 at a different azimuthal position around the circumference or periphery of the jacket 12, and regularly spaced. Within each primary capillary 14, the two secondary capillaries 20 are each bonded to the inner surface of the primary capillary at a contact point 22, the two contact points at a different azimuthal position around the circumference of the outer capillary 14. Neither contact point 22 is coincident with the contact point 16 between the primary capillary 14 and the jacket 12. For the purposes of distinction, the contact point 16 of each primary capillary can be considered to have a peripheral location or position around the jacket, and the contact point 22 of each secondary capillary can be considered to have an azimuthal location or position around the primary capillary, where the azimuthal locations are each displaced or separated from the peripheral location, in other words, neither azimuthal position coincides with the peripheral location. A diameter of each primary capillary 14 lies along a line of mirror symmetry 24 between the two secondary capillaries, the line 24 meeting the wall of the primary capillary 14 closest to the jacket at a point 26. Hence the point 26 is a midpoint between the two contact points 22, equidistant from each contact point 22. The two contact points 22 for the two secondary capillaries have an angular displacement θ from the line of mirror symmetry 24, measured as an azimuthal displacement around the circumference of the primary capillary from the point 26. Since the line 24 is a line of mirror symmetry between the two secondary capillaries, the displacements θ of the secondary capillaries are equal and opposite. The midpoint 26 between the secondary capillaries 20 has an angular or azimuthal displacement φ from the contact point 16, measured around the circumference of the primary capillary 14. These various parameters can be varied to adjust the optical loss of the fibre.

Modelling of the performance of fibres configured in accordance with the present disclosure enables the identification of ranges for the various geometric parameters which are able to deliver particularly good performance as regards optical loss of a fibre. As noted above, simulations have been carried out using representative dimensions which are appropriate for waveguiding of the standard telecommunications wavelength of 1550 nm, namely a core radius R of 15 μm and a capillary wall thickness T of 0.55 μm, with the geometric dimensions then normalised to wavelength to allow scaling for the fabrication of fibres to guide alternate wavelengths of light.

The radius of the primary capillaries 14, $r_{out}$, is given by $$r_{out} = \frac{(R+T)\sin\left(\frac{\pi}{n}\right) - T - \frac{d_{out}}{2}}{1 - \sin\left(\frac{\pi}{n}\right)}$$

where the parameters are as defined above with reference to FIG. 7, and n is the number of primary capillaries. For the results of simulations discussed below, n is five, but the results are applicable to other numbers of the primary capillaries.

The radius of the secondary capillaries 20, $r_{in}$, is given by $$r_{in} = \frac{(r_{out} - T)\sin\left(\frac{\pi}{n}\right) - \left(\frac{d_{nest}}{2} + T\right)}{1 + \sin\theta}$$

with the parameters defined as before.

Figure 9:
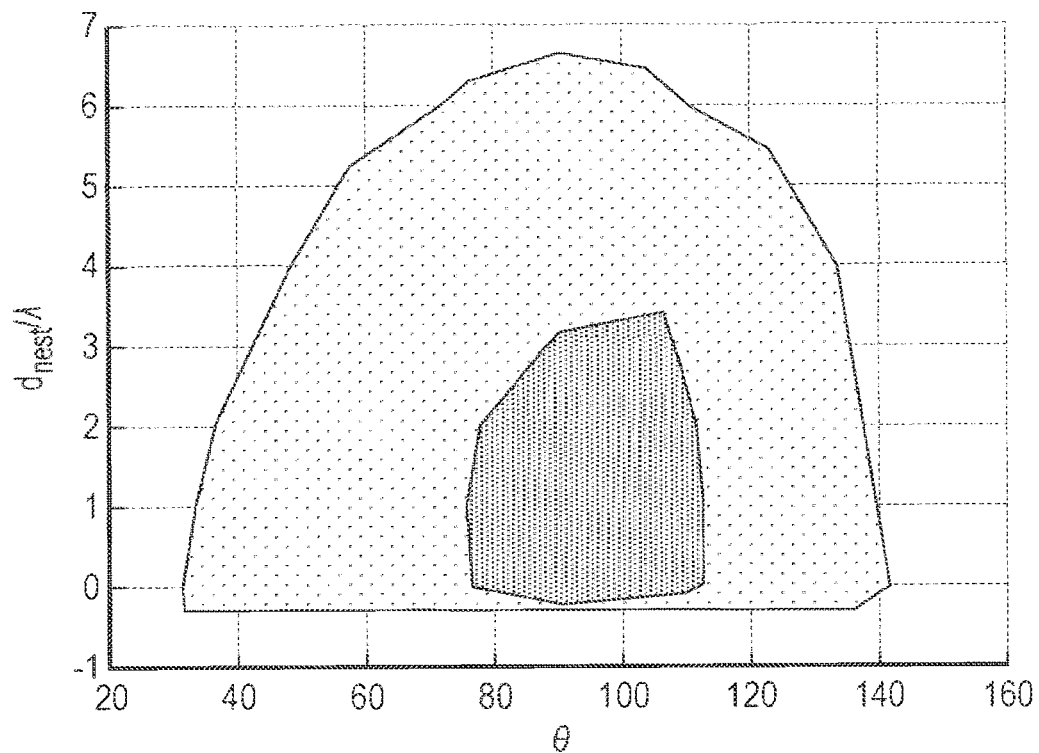
FIGS. 9 and 10 show contour plots of optical attenuation for varying cladding capillary spacings and angular positions modelled for example fibres according to the present disclosure.

FIG. 9 shows a contour plot of optical confinement loss (dB/km) for a fibre with characteristics as described above, showing the behaviour of the loss as the gap $d_{nest}$ between the secondary capillaries (normalised to the wavelength A), and the angle θ by which the secondary capillaries are displaced from the central position are varied. The angle φ is set to zero for this modelling, so the secondary capillaries are symmetrically positioned on either side of the contact point where the primary capillary is bonded to the jacket. The grey region shows the range of the parameters which give confinement loss of less than 1 dB/km. The smaller black region shows the range of the parameters which give confinement loss of less than 0.01 dB/km. From this, it can be appreciated that values of θ at or near to 90° (as depicted in FIGS. 4 and 5) are particularly beneficial in achieving very low loss. For example, θ may be substantially 90°, or may be in the range of 85° to 95°

Figure 10:
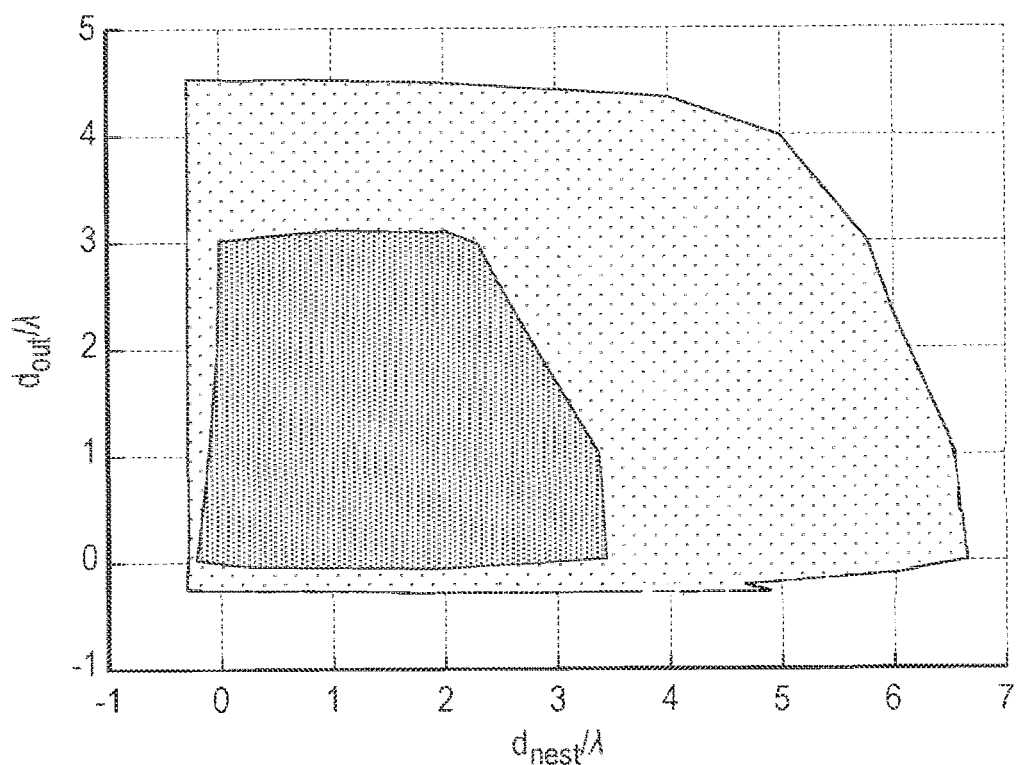

FIG. 10 shows a contour plot of optical confinement loss (dB/km) obtained from the same modelling as for FIG. 8, but showing the behaviour of the loss as the gap $d_{out}$ between the primary capillaries (normalised to wavelength λ) and the gap $d_{nest}$ between the secondary capillaries (normalised to the wavelength λ) are varied. The angle φ is set to zero as before. The grey region shows the range of the parameters which give confinement loss of less than 1 dB/km. Recall that this performance cannot be achieved from the previously-proposed NANF structure. The smaller black region shows the range of the parameters which give confinement loss of less than 0.01 dB/km.

From FIGS. 9 and 10, it can be deduced that to achieve confinement loss of 1 dB/km or below, the angle θ has a value in the range of 30° to 142°, the gap or spacing between the primary capillaries (normalised to wavelength) $d_{out}/\lambda$ has a value in the range of −0.3 to 4.5, and the gap or spacing between the secondary capillaries (normalised to wavelength $d_{nest}/\lambda$ has a value in the range of −0.3 to 6.7. Note that negative values of the spacings indicates that contact between the capillaries has occurred. Since contact is associated with larger resonances that cause increased loss in the optical transmission window for the fibre, it is possible that fibres with parameters in these parts of the ranges may show larger loss than the intended maximum value of 1 dB/km. Accordingly, the ranges may be preferred to be >0 to 4.5 for $d_{out}/\lambda$ and >0 to 6.7 for $d_{nest}/\lambda$. The specification of the lower limits of theses range as ">0" indicates that the capillaries should be arranged so as not to be in contact, i.e. the gap or spacing between them has a finite positive value.

Similarly, to achieve confinement loss of 0.01 dB/km or below ranges can be deduced from FIGS. 9 and 10 as follows: the angle θ has a value in the range of 75° to 112°, $d_{out}/\lambda$ has a value in the range of >0 to 3.1 and $d_{nest}/\lambda$ has a value in the range of >0 to 3.4.

As remarked, the modelling for FIGS. 9 and 10 assumes a value of the angle φ of 0°. In other words, the nested element or arrangement of a primary capillary with two secondary capillaries is radially aligned in that the midpoint or line of symmetry between the azimuthal positions of the secondary capillaries within the primary capillary is coincident with the contact point of the primary capillary within the jacket. The secondary capillaries have equal and opposite angular displacements from this contact point; they are positioned symmetrically. In reality, this positioning may be difficult to achieve since some shifting or rotation of the nested elements with respect to their intended positons may occur during fabrication of a preform or drawing of the fibre from the preform. Accordingly, it is important to consider the effect of misalignment of the secondary capillaries from the symmetrical positioning.

Recall that in FIG. 8, we defined the angle φ as being the angular displacement, around the circumference of the primary capillary, of the midpoint between the contact points of the two secondary capillaries from the contact point of the primary capillary with the jacket. A non-zero value of φ can be considered to be a misalignment of the nested arrangement. Modelling of the confinement loss has been carried out to investigate the effect of misalignment.

Figure 11:
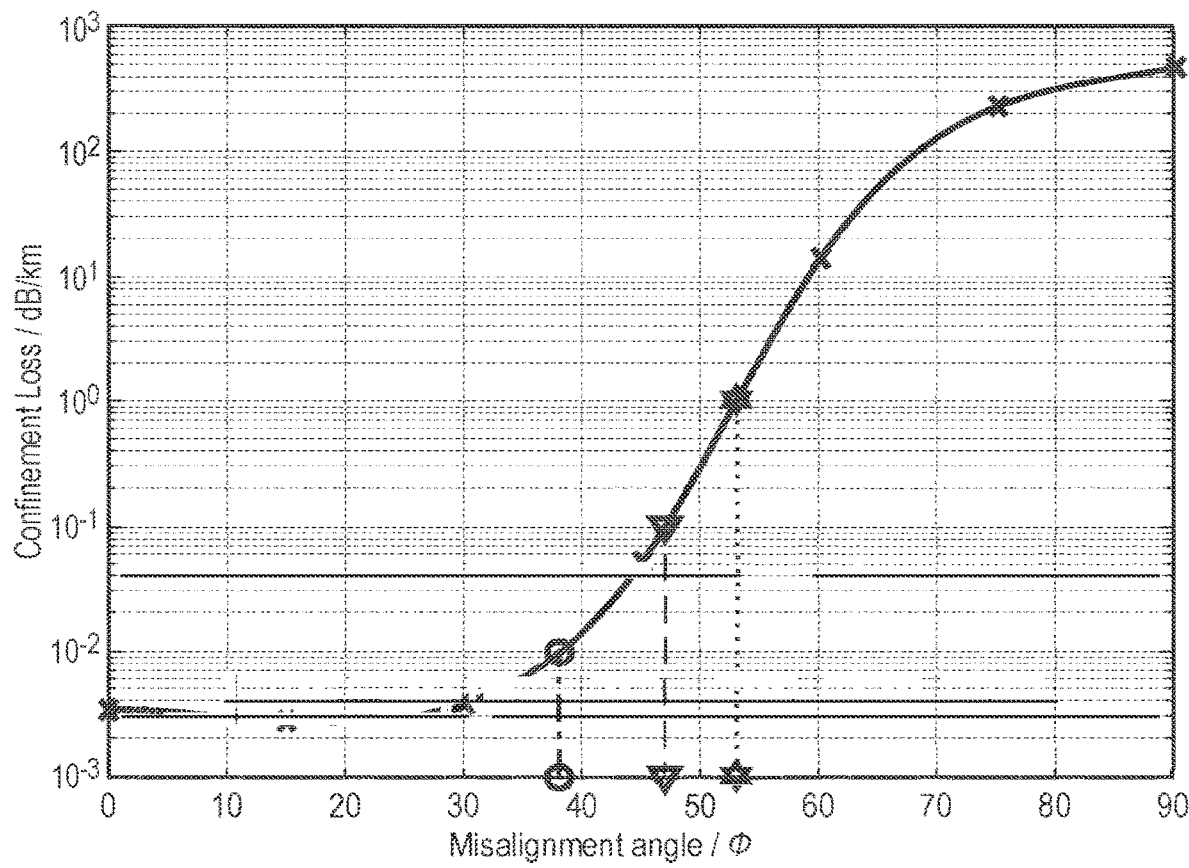
FIG. 11 shows a graph of optical attenuation against cladding capillary misalignment angle modelled for example fibres according to the present disclosure.
Figure 12:
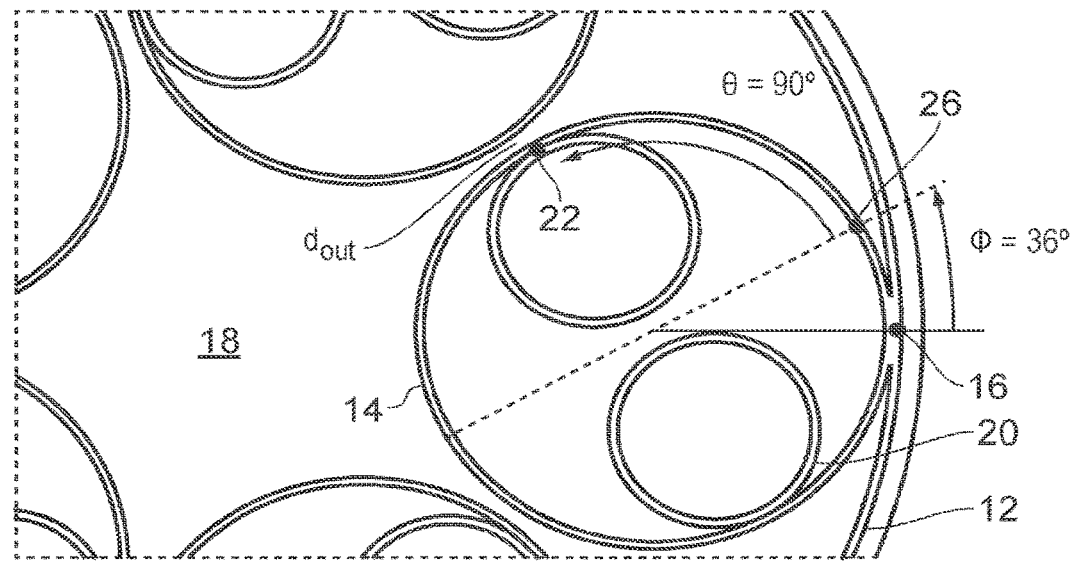
FIG. 12 shows a partial transverse cross-sectional view of an example fibre represented by data included in the graph of FIG. 11.

FIG. 11 shows a graph of the amount of confinement loss in dB/km as the misalignment varies over the range of 0° to 90° for φ. For the modelling, the angular position 6 of the secondary capillaries was set to be 90°, for minimal loss in line with the results shown in FIG. 9. The gaps $d_{out}/\lambda$ and $d_{nest}/\lambda$ had values of 1 and 2 respectively. As can be appreciated, for misalignment angles up to about 30°, there is no appreciable change in the loss, which remains well below 0.01 dB/km. This is a very useful result, indicating that a moderate level of misalignment can be tolerated in a fibre without impacting on the loss performance. Thus, manufacturing tolerances for the nested element alignment need not be overly constrained. Beyond 30°, the loss begins to increase. Interestingly, for secondary capillaries positioned at θ=90°, this corresponds with the contact point 22 of a secondary capillary 20 on the primary capillary 14 approaching the location of the gap $d_{out}$ between the neighbouring primary capillaries. The positions of the contact point and the gap coincide when ϕ=36°, for θ=90°. This configuration is shown in FIG. 12.

Beyond this position, as the contact point 22 passes the location of the narrowest part of the gap between the primary capillaries and moves towards the core so that the contact point 22 becomes part of the core boundary, the loss increases rapidly, as can be seen from FIG. 10. A misalignment angle of 38° corresponds to a loss of 0.01 dB/km, marked in FIG. 11 by a dot-dash line. A misalignment angle of 47° corresponds to a loss of 0.1 dB/km, marked in FIG. 11 by a dashed line. A misalignment angle of 53° corresponds to a loss of 1 dB/km, marked in FIG. 11 by a dotted line. Accordingly, in order to achieve a confinement loss level of 1 dB/km or below, the misalignment angle ϕ should be in the range of 0° to 53°, and to achieve a confinement loss level of 0.01 dB/km or below, the misalignment angle ϕ should be in the range of 0° to 38°. For an intermediate loss level of 0.1 dB/km or below, ϕ should be in the range of 0° to 47°. Note that the values of ϕ are modular values, so the rotation of the nested arrangement away from ϕ=0° may be in either direction; it is not restricted to rotation in the anticlockwise direction suggested in FIG. 12.

Note that the parameters of azimuthal position 6 and capillary spacings $d_{out}/\lambda$ and $d_{nest}/\lambda$ map onto the sizes of the capillaries, which vary to accommodate changes in the angle and spacings. Accordingly, the achievable loss properties available from the new fibre designs may alternatively or additionally be defined by reference to the capillary sizes. In particular, one can consider the ratio of the sizes of the primary and secondary capillaries, which has a limit set by the need to accommodate two secondary capillaries in a non-contacting arrangement within a primary capillary.

Figure 13:
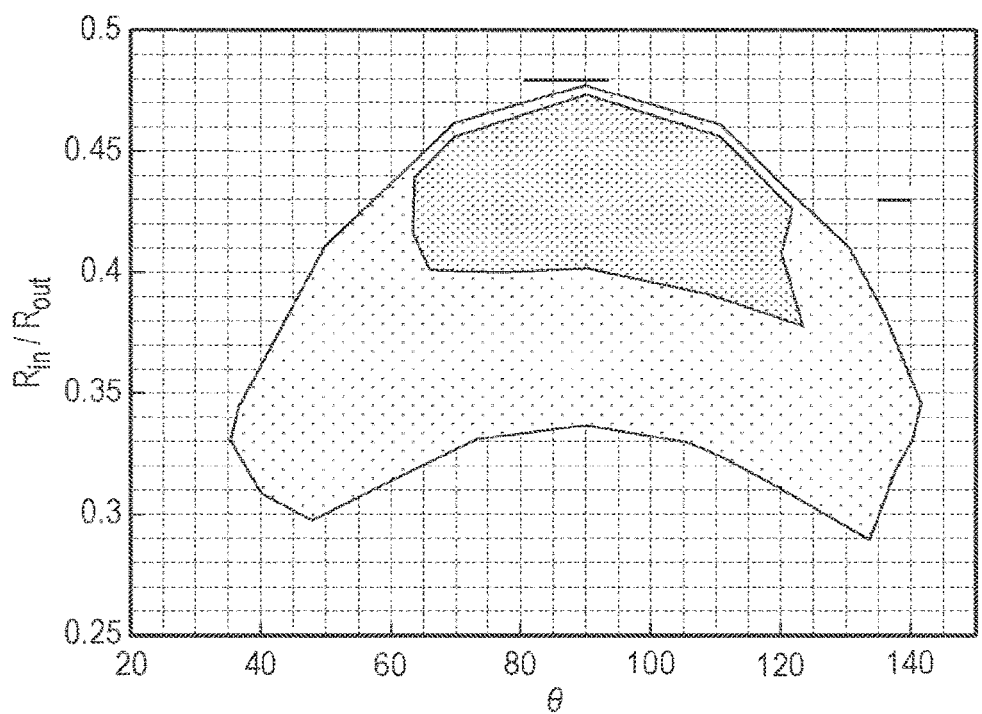
FIG. 13 shows a contour plot of optical attenuation for varying cladding capillary sizes and angular positions modelled for example fibres according to the present disclosure.

FIG. 13 shows a contour plot of optical confinement loss similar to the plots of FIGS. 9 and 10 (and obtained by reformulation of the data shown in FIGS. 9 and 10), but showing the loss achievable as both the azimuthal position 6 of the secondary capillaries and the ratio of the secondary capillary radius to the primary capillary radius $r_{in}/r_{out}$ are varied. As before, the grey area indicates loss of 1 dB/km or below and the black area indicates loss of 0.01 dB/km.

From FIG. 13, we therefore deduce that to provide attenuation of 1 dB or below, the secondary capillaries should have a radius $r_{in}$ in the range of 0.29 $r_{out}$, the radius of the primary capillary, or above. For an attenuation of 0.01 dB/km the secondary capillaries should be large, with a radius $r_{in}$ in the range of 0.38 $r_{out}$ or above. In both cases, this defines a lower limit or minimum size for the secondary capillaries. The maximum permissible size for the secondary capillaries is limited by the need to provide a finite gap, $d_{nest}$, between the two secondary capillaries. From FIG. 13, this can be seen to be about 0.47 $r_{out}$ for both attenuation levels. These ranges correspond to the range for the angle θ of about 30° to 142° also evident from FIG. 9.

While the plots of FIGS. 9, 10 and 13 show contours for loss levels of 1 dB/km and below and 0.01 dB/km and below, it is possible to also define ranges for the various geometric parameters that correspond to other loss levels. Table 1 shows ranges defined in terms of upper and lower limits for the angle θ and the spacings $d_{out}/\lambda$ and $d_{nest}/\lambda$ for loss levels of 1 dB/km (as already given above), 0.2 dB/km, 0.1 dB/km and 0.01 dB/km (also as already given above). A loss value of 0.2 dB/km is the telecommunications industry standard for conventional silica solid core optical fibre.

TABLE 1

| Parameter | 1 dB/km | | 0.2 dB/km | | 0.1 dB/km | | 0.01 dB/km | |
|---|---|---|---|---|---|---|---|---|
| | Lower | Upper | Lower | Upper | Lower | Upper | Lower | Upper |
| θ° | 30 | 142 | 48 | 123 | 50 | 150 | 75 | 112 |
| $d_{out}/\lambda$ | −0.3 | 4.5 | −0.2 | 4.1 | −0.2 | 3.9 | >0 | 3.1 |
| $d_{nest}/\lambda$ | −0.3 | 6.7 | −0.3 | 5.55 | −0.3 | 5.1 | >0 | 3.4 |

Accordingly, an antiresonant hollow core optical fibre with a cladding structure configured in accordance with the present disclosure offers significantly improved performance as regards propagation loss compared with existing hollow core optical fibres designs. Such fibre is suitable for a wide range of optical fibre applications, in particular optical fibre telecommunications, A hollow core fibre in line with the present disclosure can be fabricated using known methods for making antiresonant hollow core fibres, which can be drawn in a conventional manner from a preform, optionally via an intermediate cane, configured with the transverse cross-sectional structure desired for the finished fibre but on a larger scale. The known reduction in cross-sectional area from a preform to a finished fibre can be used to appropriately scale up the dimensions set out herein to construct, from suitably sized tubes or tubular elements, preforms from which fibres dimensioned according to the present disclosure can be fabricated. Similarly, the fibres may be made from materials known for the fabrication of existing designs of antiresonant hollow core fibre, glass materials such as silica, and polymer materials. The various tubes or capillaries (outer jacket and primary and secondary capillaries) in a single preform or fibre may be made from the same material or from different materials. Types of glass include "silicate glasses" or "silica-based glasses", based on the chemical compound silica (silicon dioxide, or quartz), of which there are many examples. Other glasses suitable for optical applications include, but are not limited to, chalcogenide, tellurite glasses, fluoride glasses, and doped silica glasses. The materials may include one or more dopants for the purpose of tailoring the optical properties, such as modifying absorption/transmission or enabling optical pumping.

The ARF cladding structure disclosed herein is not limited to the examples given, and an antiresonant hollow core optical fibre in accordance with the present disclosure may have a modified structure compared to these examples, and/or may include additional features or elements in the cladding.

Figure 14:
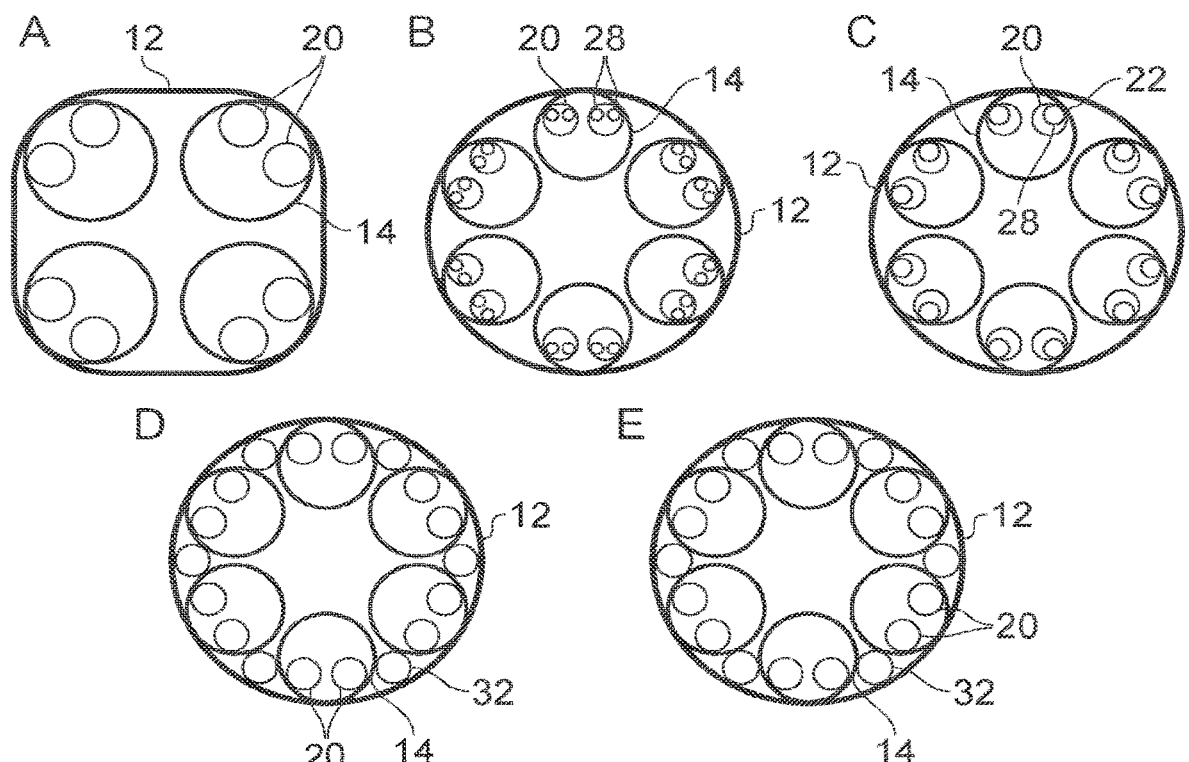
FIGS. 14A to 14E show schematic transverse cross-sectional views of further example antiresonant hollow core fibres according to the present disclosure.

FIG. 14 shows a selection of such ARFs, with structures comprising modifications or additional features compared to the examples described thus far. FIG. 14A shows a cross-sectional transverse view of an example antiresonant hollow core optical fibre in which the jacket 12 has a substantially square cross-section, with four primary capillaries 14 bonded to its inner surface, one primary capillary 14 at each corner of the square shape. Each primary capillary 14 has two spaced-apart secondary capillaries 20 positioned within, as described herein.

FIG. 14B shows a cross-sectional transverse view of an example antiresonant hollow core optical fibre which comprises six evenly-spaced apart primary capillaries 14 each with two secondary capillaries 20 inside, as in the FIG. 4 example (although with a smaller value of the angle θ). Additionally, each secondary capillary 20 has two smaller tertiary capillaries 28 bonded to its inner surface in a spaced-apart arrangement, to create further low loss gap features (between the adjacent tertiary capillaries 28 inside each secondary capillary 20) echoing the gaps between the primary capillaries 14.

FIG. 14C shows a cross-sectional transverse view of an example antiresonant hollow core optical fibre again comprising six-evenly spaced apart primary capillaries 14 each with two secondary capillaries 20 as described with regard to FIG. 4, and also having smaller tertiary capillaries 28 nested inside the secondary capillaries 20. Unlike the FIG. 14B example, in this case there is only one tertiary capillary 28 inside each secondary capillary 20. The tertiary capillary 28 is bonded to the inner surface of the secondary capillary 20 in line with the bond position 22 of the secondary capillary 20 on the inner surface of the primary capillary 14.

FIGS. 14D and 14E each show a cross-sectional transverse view of an example antiresonant hollow core optical fibre, which, in common with the two preceding examples, has six evenly spaced apart primary capillaries 14 inside the jacket 12, each of which has two secondary capillaries 20 positioned in accordance with the present disclosure. No tertiary capillaries are included. Rather, these examples includes six additional tubes or capillaries 32, smaller than the primary capillaries 14, and positioned against the inner surface of the jacket 12 between the primary capillaries 14. In the FIG. 14D example, there are gaps between the additional capillaries 32 and the adjacent primary capillaries 14, while in the FIG. 14E example, there are no such gaps.

Other cladding structures are not excluded, and are considered within the scope of the present disclosure to the extent that they include two secondary capillaries within each primary capillary and positioned as described herein, namely such that they are spaced apart from one another and each bonded to an inner surface of the primary capillary at an azimuthal location around the circumference of the primary capillary which is displaced from the peripheral location of the primary capillary within the jacket of the hollow core optical fibre.

Preforms and canes for making hollow core optical fibres as described herein are also contemplated, where a preform or a cane comprises a collection of tubes each corresponding to a capillary or jacket of the intended optical fibre structure and positioned relative to the other tubes so as to produce a hollow core optical fibre with a jacket, cladding and hollow core as described herein.

The various embodiments described herein are presented only to assist in understanding and teaching the claimed features. These embodiments are provided as a representative sample of embodiments only, and are not exhaustive and/or exclusive. It is to be understood that advantages, embodiments, examples, functions, features, structures, and/or other aspects described herein are not to be considered limitations on the scope of the invention as defined by the claims or limitations on equivalents to the claims, and that other embodiments may be utilised and modifications may be made without departing from the scope of the claimed invention. Various embodiments of the invention may suitably comprise, consist of, or consist essentially of, appropriate combinations of the disclosed elements, components, features, parts, steps, means, etc., other than those specifically described herein. In addition, this disclosure may include other inventions not presently claimed, but which may be claimed in the future.

REFERENCES

[1] Anton N. Kolyadin, Alexey F. Kosolapov, Andrey D. Pryamikov, Alexander S. Biriukov, Victor G. Plotnichenko, and Evgeny M. Dianov, "Light transmission in negative curvature hollow core fiber in extremely high material loss region", Opt. Express 21, 9514-9519 (2013)
[2] Francesco Poletti, "Nested antiresonant nodeless hollow core fiber", Opt. Express 22, 23807-23828 (2014)
[3] WO 2015/185761
[4] Md. Selim Habib, Ole Bang, and Morten Bache, "Low-loss hollow-core silica fibers with adjacent nested anti-resonant tubes", Opt. Express 23, 17394-17406 (2015)
[5] A F Kosolapov, G K Alagashev, A N Kolyadin, A D Pryamikov, A S Biryukov, I A Bufetov and E M Dianov, "Hollow-core revolver fibre with a double-capillary reflective cladding", Quantum Electronics, 46(3), 267 (2016)

The invention claimed is:

1. A hollow core optical fibre comprising:
   a tubular jacket;
   a cladding comprising a plurality of primary capillaries spaced apart from one another in a ring and each bonded to an inner surface of the jacket at a peripheral location around the circumference of the jacket; and
   a hollow core formed by a central void within the ring of primary capillaries;
   wherein the cladding further comprises, within each primary capillary, two secondary capillaries and no more, the two secondary capillaries spaced apart from one another and each bonded to an inner surface of the primary capillary at an azimuthal location around the circumference of the primary capillary which is displaced from the peripheral location of the primary capillary.

2. A hollow core optical fibre according to claim 1, comprising five primary capillaries.

3. A hollow core optical fibre according to claim 1, comprising four, six, seven, eight, nine or ten primary capillaries.

4. A hollow core optical fibre according to claim 1, in which the azimuthal locations of the two secondary capillaries have substantially equal and opposite angular displacements from the peripheral location.

5. A hollow core optical fibre according to claim 1, in which the azimuthal locations of the two secondary capillaries have substantially equal and opposite angular displacements from a midpoint on the circumference of the primary capillary between the azimuthal locations, and the midpoint has an angular displacement from the peripheral location.

6. A hollow core optical fibre according to claim 5, in which the midpoint has an angular displacement of 30 degrees or less.

7. A hollow core optical fibre according to claim 5, in which the midpoint has an angular displacement of substantially 38 degrees or less.

8. A hollow core optical fibre according to claim 5, in which the midpoint has an angular displacement of substantially 53 degrees or less.

9. A hollow core optical fibre according to claim 4, in which the equal and opposite angular displacement of the azimuthal locations is in the range of 30 degrees to 142 degrees.

10. A hollow core optical fibre according to claim 4, in which the equal and opposite angular displacement of the azimuthal locations is in the range of 75 degrees to 112 degrees.

11. A hollow core optical fibre according to claim 4, in which the equal and opposite angular displacement of the azimuthal locations is in the range of 85 degree to 95 degrees.

12. A hollow core optical fibre according to claim 1, in which the primary capillaries are spaced apart by gaps $d_{out}$ in the range of $0 < d_{out}/\lambda \leq 4.5$ and the secondary capillaries are spaced apart by gaps $d_{in}$ in the range of $0 < d_{in}/\lambda \leq 6.7$, where $\lambda$ is an optical wavelength of light which the hollow core optical fibre is configured to guide.

13. A hollow core optical fibre according to claim 1, in which the primary capillaries are spaced apart by gaps $d_{out}$ in the range of $0 < d_{out}/\lambda \leq 3.1$ and the secondary capillaries are spaced apart by gaps $d_{in}$ in the range of $0 < d_{in}/\lambda \leq 3.4$, where $\lambda$ is an optical wavelength of light which the hollow core optical fibre is configured to guide.

14. A hollow core optical fibre according to claim 1, in which the secondary capillaries have an inner radius $r_{in}$ which is at least 0.29 times an inner radius $r_{out}$ of the primary capillaries.

15. A hollow core optical fibre according to claim 1, in which the secondary capillaries have an inner radius $r_{in}$ which is at least 0.38 times an inner radius $r_{out}$ of the primary capillaries.

16. A hollow core optical fibre according to claim 1, and having a level of optical propagation loss for guided light at a wavelength which the hollow core optical fibre is configured to guide which is 1 dB/km or less.

17. A hollow core optical fibre according to claim 1, and having a level of optical propagation loss for guided light at a wavelength which the hollow core optical fibre is configured to guide which is 0.01 dB/km or less.

18. A preform or a cane for making a hollow core optical fibre which is configured to be drawn into a hollow core optical fibre according to claim 1.

19. A preform or a cane for making a hollow core optical fibre, and comprising:
   an outer tube for forming a jacket;
   a plurality of primary tubes for forming primary capillaries to define a cladding of the fibre, the primary tubes spaced apart from one another in a ring around a central void to form a hollow core, each primary tube arranged against an inner surface of the outer tube at a peripheral location around the circumference of the outer tube; and
   within each primary tube, two secondary tubes and no more, the secondary tubes spaced apart from one another and each arranged against an inner surface of the primary tube at an azimuthal location around the circumference of the primary tube which is displaced from the peripheral location of the primary tube.

* * * * *